UNITED STATES PATENT OFFICE.

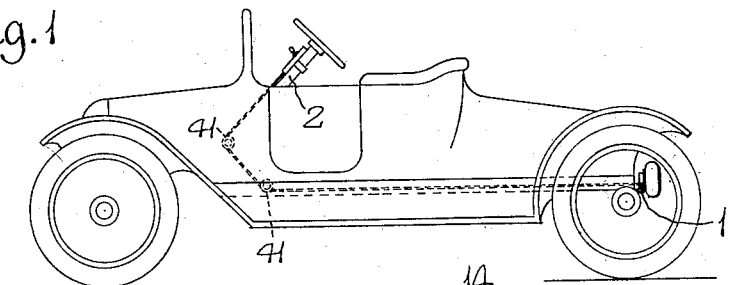
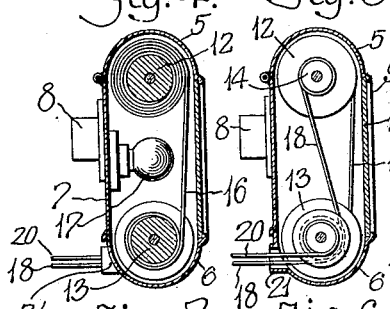
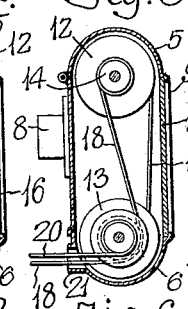
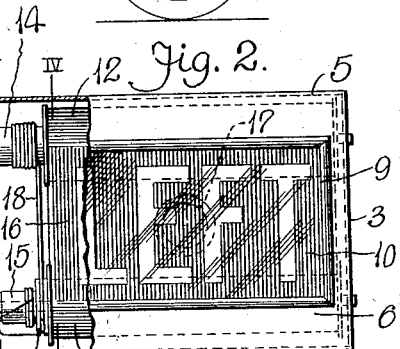

ALBERT A. GOTTFRIED, OF DETROIT, MICHIGAN.

OPERATING DEVICE FOR SIGNALS.

1,215,521.  Specification of Letters Patent.  Patented Feb. 13, 1917.

Application filed November 29, 1915. Serial No. 64,007.

*To all whom it may concern:*

Be it known that I, ALBERT A. GOTTFRIED, a citizen of the United States of America, residing at Detroit, in the county of Wayne and State of Michigan, have invented certain new and useful Improvements in Operating Devices for Signals, of which the following is a specification, reference being had therein to the accompanying drawings.

This invention relates to signals and more particularly to certain improvements in connection with an indicator for automobiles disclosed by my pending application filed Sept. 11, 1915, Serial No. 50,174, wherein there is shown an exhibitor for displaying signals in connection with an automobile, and novel means for actuating the exhibitor, whereby an approaching automobile or similar vehicle may determine, in advance, the movement of the signal carrying automobile or vehicle, and thus avoid rear-on collision and accidents incident to sudden stopping or a change in direction of travel.

My present invention aims to provide a signal which may be used in connection with an automobile or other vehicle, or as a street signal to control and direct vehicular traffic. The signal embodies a novel exhibitor which can be manufactured at a comparatively small cost, easily operated, and easily installed to withstand the forces of nature to which it is subjected by exposure. The signal also includes novel means for operating the exhibitor at a remote point, said means permitting an operator to quickly actuate the exhibitor to display the desired sign or symbol by which pedestrians and automobilists can determine the operation of the signal carrying vehicle.

My invention will be hereinafter specifically described and then claimed, and reference will now be had to the drawings, wherein—

Figure 1 is an elevation of an automobile provided with a signal in accordance with this invention;

Fig. 2 is a front elevation of the exhibitor of the signal, partly broken away and partly in section;

Fig. 3 is a cross sectional view taken on the line III—III of Fig. 2;

Fig. 4 is a similar view taken on the line IV—IV of Fig. 2;

Fig. 5 is a front elevation of a modified form of exhibitor, partly broken away and partly in section;

Fig. 6 is a cross sectional view taken on the line VI—VI of Fig. 5;

Fig. 7 is a similar view taken on the line VII—VII of Fig. 5;

Fig. 8 is an elevation of an actuating device for the exhibitor shown in Figs. 2 to 7 inclusive;

Fig. 9 is a longitudinal sectional view of the actuating device, and Fig. 10 is a cross sectional view of the same.

When used as a signal in connection with an automobile, as shown in Fig. 1, the exhibitor is supported by a bracket 1 carried by the rear end of the automobile and the exhibitor is adapted to be actuated by a device clamped or otherwise mounted upon the steering post or column 2 of the automobile.

Considering first the detail construction of the exhibitor as illustrated in Figs. 2, 3 and 4, the exhibitor comprises a casing having end walls 3 and 4, top and bottom rounded or semi-cylindrical walls 5, an apertured front wall 6, and a hinged or detachable rear wall 7 provided with a socket member 8 whereby it may be detachably connected to the bracket 1 of the automobile.

The apertured front wall 6 provides a display or sight opening 9 normally closed by a transparent plate 10, preferably made of glass. In the end walls 3 and 4 of the casing are journaled the pintles 11 of rollers 12 and 13, said rollers having necks or spindles 14 and 15 respectively, adjacent the end wall 4 of the casing.

Attached to and wound upon the roller 12 is an apron or display sign 16, preferably made of a flexible water-proof material upon which may be printed or otherwise marked a plurality of signs, symbols or designations, such as "stop", "slow", "right", "left" and a danger symbol. These signs may be formed of prominent characters that can be easily read through the sight opening of the casing and the danger symbol may be a red color. In order that the exhibitor may be used at night or in dark places, the apron 16 can be made of a thin or transparent material and painted or otherwise treated to provide a dark background or opaque portion, while the characters of the words or the symbols on the apron may be left translucent, whereby an incandescent lamp 17 placed within the casing may cast rays of light through the translucent portion of the apron. The incandescent lamp 17 may be supported from the rear wall 7, or the end walls 3 and 4, said lamp having a suitable source of electrical energy, as a battery, or being in circuit with the ordinary ignition or lighting system of the automobile. When used at night, a neutral position of the apron displays the red danger signal constituting a tail light, and the signal may be used in conjunction with an ordinary tail light or the illuminating means for a license tag.

Connected to and wound upon the spindle 14 of the roller 12 is a cable 18 trained under a grooved pulley or sheave 19 loosely mounted upon the spindle 15 of the roller 13.

Attached to and wound upon the spindle 15 of the roller 13 is a cable 20 and this cable, together with the cable 18, extends through an opening 21 in the casing, at the rear wall thereof, and constitutes means whereby the apron 16 may be wound and unwound relative to the rollers 12 and 13 to display a desired signal at the sight opening of the casing.

In Figs. 5 to 7 inclusive there is illustrated a slight modification in connection with the exhibitor, wherein an endless apron or flexible sign 22 is substituted for the apron or flexible sign 16, and in this instance, it is necessary that the incandescent lamp 17 be supported from the walls 3 and 4 of the casing in order to illuminate the apron and not interfere with a movement thereof.

The actuating device for the exhibitor comprises an oblong casing 23 provided with clamping members 24 or other fastening means whereby it may be secured to the steering post 2 of the automobile. The casing 23 has a detachable cover plate 25 and contiguous to a longitudinal edge thereof is a longitudinal slot 26. Slidable in the slot 26 is a tongue 27 of a block 28 and said block is movable upon seats 29 provided therefor in one of the side walls of the casing 23 and in a longitudinal partition 30 disposed in parallelism to said side wall. Connected to the block 28 by a set screw 31 or other fastening means is a detent or resilient member 32 normally engaging the bottom wall of the casing 23 and adapted to engage in notches 33 provided therefor in said wall.

Connected to the tongue 27 of the block 28 is an indicator plate 34 which overlies the cover plate 25, and assisting rivets 35 in holding the indicator plate in engagement with the tongue of a block 28, is a hand piece 36 by which the block 28 may be conveniently shifted in the casing 23. The indicator plate 34 moves in proximity to designations 37 or other indicia upon the cover plate 25.

The block 28 has the ends thereof provided with apertured lugs 28 and the cables 18 and 20 are adapted to extend through a slot 29 in the end of the casing and be connected to the apertured lugs 38. One of the cables is trained around a grooved sheave or pulley 40 horizontally disposed in one end of the casing, and when the exhibitor and the actuating device are used in connection with an automobile, idle pulleys or sheaves 41 are suitably disposed to permit of the cables conveniently extending from the rear end of the automobile to the steering post thereof.

The notches 33 correspond in number to the designations 37 upon the cover plate 25 of the casing and these designations correspond in number to the signs or signals upon the apron of the exhibitor, whereby the operator of the automobile can easily shift the block 28 and thereby move the cables 18 and 20 to wind and unwind the apron or shift it into such position that the desired sign or signal will be displayed. The designation N on the cover plate 25 indicates neutral position of the exhibitor apron, and as before mentioned, this neutral position may represent a danger signal constantly displayed during a normal operation of the automobile.

What I claim as my invention is:—

1. An actuating device for signals comprising an oblong casing, a slotted cover plate therefor, a block slidable in said casing and operable from the exterior of said casing, means carried by said block and adapted to engage said casing to hold said block in an adjusted position, and cables extending into said casing and connected to said block and adapted to be shifted thereby.

2. An actuating device for signals adapted to be operated by cables, comprising a casing, a block slidable in said casing and adapted for attachment to a cable, means carried by said block engaging said casing for holding said block in adjusted position, and means exterior of said casing to facilitate moving said block.

3. An actuating device for cable operated signals, comprising a casing, a slotted cover plate thereon provided with indicia, a block slidable in said casing adapted for attachment to cables, means carried by said block engaging said casing to hold said block in adjusted position, an indicator plate movable with said block in proximity to the indicia on said cover plate, and means connecting said indicator plate to said block and facilitating moving said block within said casing.

In testimony whereof I affix my signature in presence of two witnesses.

ALBERT A. GOTTFRIED.

Witnesses:
CHAS. W. STAUFFIGER,
ANNA M. DORR.

Copies of this patent may be obtained for five cents each, by addressing the "Commissioner of Patents, Washington, D. C."